(12) United States Patent
Ogawa

(10) Patent No.: US 7,243,534 B2
(45) Date of Patent: Jul. 17, 2007

(54) TIRE STATE QUANTITY DETECTING APPARATUS AND METHOD

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 392 days.

(21) Appl. No.: 10/936,602

(22) Filed: Sep. 9, 2004

(65) Prior Publication Data

US 2005/0057346 A1    Mar. 17, 2005

(30) Foreign Application Priority Data

Sep. 16, 2003    (JP)    ............... 2003-322341

(51) Int. Cl.
*G01M 17/02* (2006.01)
(52) U.S. Cl. ..................................... 73/146
(58) Field of Classification Search ............. 73/146, 73/146.2, 146.3, 146.4, 146.5, 146.8
See application file for complete search history.

(56) References Cited

U.S. PATENT DOCUMENTS

| 2002/0092364 A1 | 7/2002 | Adderton et al. |
| 2004/0260436 A1* | 12/2004 | Kin ............................. 701/29 |
| 2005/0012386 A1* | 1/2005 | Nakano et al. .......... 303/114.1 |

FOREIGN PATENT DOCUMENTS

| DE | 698 04 098 T2 | 10/2002 |
| JP | A-2002-36836 | 2/2002 |

* cited by examiner

*Primary Examiner*—Andre J. Allen
(74) *Attorney, Agent, or Firm*—Oliff & Berridge, PLC (57) ABSTRACT

In a tire state quantity detecting apparatus, a detector that deforms by force exerted from a tire and that outputs a signal corresponding to the quantity of deformation is embedded within the tire. The detector is enclosed in a capsule within the tire, so that the quantity of deformation of the detector is reduced relative to the quantity of deformation of the tire.

21 Claims, 10 Drawing Sheets

TIRE INTERNAL PRESSURE

| | | | 100 | ... |
|---|---|---|---|---|
| | ⋮ | | | |
| | | 1 | | |
| | | | | |
| | | ⋮ | | |
| | | 10 | 500 | |
| | | ⋮ | | |

DISTORTION (row label)

TIRE STATE QUANTITY DETECTING APPARATUS AND METHOD

The disclosure of Japanese Patent Application No. 2003-322341 filed on Sep. 16, 2003, including the specification, drawings and abstract is incorporated herein by reference in its entirety.

BACKGROUND OF THE INVENTION

1. Field of Invention

The invention relates to a tire state quantity detecting apparatus and method for detecting a quantity of state of the tire. More particularly, the invention relates to a technology for expanding the range of detection of the tire state quantity.

2. Description of Related Art

There is a known tire state quantity detecting apparatus that is provided in a tire to detect a quantity of state of the tire as described in Japanese Patent Application Laid-Open Publication No. 2002-36836.

Japanese Patent Application Laid-Open Publication No. 2002-36836 describes a technology in which distortion gages are attached to side surfaces of ribs or blocks provided in a tread part of a tire which contacts the ground, or to inner surfaces between ribs or blocks, in order to estimate the coefficient of friction between the tire and the road surface.

Although this technology detects the quantity of deformation of the tire via the distortion gages during the running of the vehicle, it is readily possible for the actual quantity of deformation of the tire to exceed the normal range of detection of the distortion gages.

Therefore, the adoption of this technology does not always accomplish accurate detection of the quantity of deformation of a tire, that is, does not always accomplish accurate detection of a tire state quantity.

SUMMARY OF THE INVENTION

It is an object of the invention to provide a tire state quantity detecting apparatus provided in a tire for detecting a quantity of state of the tire, in which the range of detection of the tire state quantity can be expanded.

In accordance with a first aspect of the invention, a tire state quantity detecting apparatus provided in a tire for detecting a state quantity of the tire includes: a detector that is embedded in the tire, and that deforms by a force exerted from the tire, and that outputs a signal corresponding to a quantity of deformation of the detector; a reduction mechanism that is disposed between the tire and the detector, and that dynamically reduces the quantity of deformation of the detector with respect to a quantity of deformation of the tire, wherein the tire state quantity is detected based on the output signal of the detector.

According to the first aspect, in order to detect the quantity of deformation of the tire as a tire state quantity, the detector that deforms by a force exerted from the tire and that outputs a signal corresponding to the quantity of deformation thereof is embedded in the tire. Therefore, according to this aspect, it becomes easier to accurately detect the quantity of deformation of the tire than in the case where a detector is provided on a tire surface. Furthermore, in this aspect, the reduction mechanism disposed between the tire and the detector dynamically reduces the quantity of deformation of the detector with respect to the quantity of deformation of the tire. Hence, according to this aspect, the deformation quantity sensitivity of the detector for the quantity of deformation of the tire becomes less, and therefore the detection range of the quantity of deformation of the tire becomes larger than in the case where a reduction mechanism is not provided. Therefore, according to this aspect, it becomes easier to avoid an event that the quantity of deformation of a tire exceeds the detection range of the detector due to a great quantity of deformation of the tire. As a result, according to this aspect, the detection range of a tire state quantity is expanded, so that the reliability regarding the detected values of the tire state quantity can be improved.

An example of the "tire" in this aspect is a vehicular tire that is mounted in a vehicle and is rolled on a road surface. However, the tire may also be other kinds of tires whose deformation is critical.

Examples of the "quantity of deformation of the tire" in this aspect include distortion, extension, contraction, bend, twist, etc. of the tire. As for the direction in which the "quantity of deformation of the tire" occurs, it is possible to select, for example, an up-down direction, a transverse direction, a front-rear direction, etc., relative to the tire in a state where the tire is disposed at a predetermined position in the vehicle.

The "tire state quantity" can be, for example, the quantity of deformation of a tire, or the force that acts on a tire, for example, the ground contact load, the front-rear force, the transverse force, etc., or the coefficient of friction between a tire and a road surface.

The "quantity of deformation of the detector" can be, for example, a quantity of deformation of the configuration of the detector itself.

As for the type of the "detector" it is possible to adopt a type that includes a plurality of portions which are displaceable relative to one another and whose positions relative to one another change in accordance with the tire deformation quantity, such as an electrical capacitance type displacement sensor or the like. In the case where this type of detector is adopted, displacements of the plural portions relative to one another causes changes in a configuration defined by coordination of the plural portions. Therefore, in this case, relative displacements among the plural portions correspond to the "quantity of deformation of the detector", similarly to the aforementioned case.

In the first aspect, the detector may include at least one of an electrical capacitance type displacement sensor, a piezoelectric element and a distortion gage.

In the first aspect, the output signal of the detector may be corrected so as not to be dependent on the temperature of the detector. With this arrangement, even if the output signal of the detector is dependent on the temperature of the detector, the post-correction output signal of the detector becomes free from dependency on the temperature of the detector. Hence, according to this form, it becomes easy to maintain the reliability of detection values of the tire state quantity despite temperature changes of the detector.

In the first aspect, the reduction mechanism may include a housing that accommodates the detector in the tire, and that has a hardness that is greater than a hardness of an embedment portion of the tire in which the detector is embedded. In this construction, the housing, having a greater hardness than the embedment portion of the tire in which the detector is embedded, accommodates the detector within the tire. Therefore, according to this form, the quantity of deformation of the detector is advantageously small relative to the quantity of deformation of the tire.

In the first aspect, the quantity of deformation of the detector may include a quantity of deformation that occurs in an up-down direction with respect to the tire disposed at a predetermined position in a vehicle and that is based on a ground contact load of the tire, and the detector may be embedded in a tread part of the tire. This construction facilitates accurate detection of the ground contact load of the tire based on the output signal of the detector.

In the first aspect, the tire state quantity detecting apparatus may be used together with a signal processor that processes an output signal of the detector occurring when an embedment portion of the tread part in which the detector is embedded contacts a ground, as a signal that indicates the quantity of deformation of the detector, based on a rotation angle of the tire.

The detector-embedded portion of the tread part alternates between a state of being in contact with the ground and a state of being out of contact with the ground as the tire rotates. Therefore, there exist time periods during which the output signal of the detector does not accurately reflect the ground contact load of the tire. In the above-described construction, the output signal of the detector occurring when the detector-embedded portion of the tread part contacts the ground is processed as a signal that indicates the quantity of deformation of the detector on the basis of the rotation angle of the tire. Therefore, this form avoids an event that an output signal of the detector is processed as a signal that accurately reflects the ground contact load of the tire although the output signal actually does not accurately reflect the ground contact load of the tire.

The aforementioned "signal processor" may be designed as a component element of the tire state quantity detecting apparatus, or may be designed as an element separate from the tire state quantity detecting apparatus. For example, if the aforementioned "tire" is a vehicular tire, the "signal processor" may be disposed on a vehicle body.

In the first aspect, the tire state quantity detecting apparatus may further include a communication device that wirelessly transmits a signal indicating a result of detection carried out by the detector. In this construction, the signal indicating a result of detection carried out by the detector embedded in the tire is wirelessly transmitted to a device outside the tire, so that the tire state quantity can easily be monitored remotely.

In the tire state quantity detecting apparatus in the first aspect, the quantity of deformation of the detector may include a quantity of deformation that occurs in an up-down direction with respect to the tire disposed at a predetermined position in a vehicle, and that is based on a ground contact load of the tire, and the detector may be embedded in a tread part of the tire, and the communication device may transmit a signal indicating a result of detection carried out by the detector when an embedment portion of the tread part in which the detector is embedded contacts a ground.

In this form, the communication device transmits a signal indicating a result of detection carried out by the detector when the embedment portion of the tread part in which the detector is embedded contacts the ground, that is, when a quantity of deformation that accurately reflects the ground contact load of the tire is occurring in the detector. Therefore, according to this form, it is ensured that the signal transmitted from the communication device on the tire side be a signal that sufficiently accurately reflects the ground contact load of the tire. Hence, it becomes easy to improve the reliability regarding the signal that is transmitted.

In tire state quantity detecting apparatus in the above-described form, the number of detectors embedded in the tread part may be one.

If a plurality of detectors are embedded in the tread part, and are aligned in a direction of circumference of the tire, there is a possibility of coexistence of a detector whose embedment portion in the tread part is in contact with the ground and a detector whose embedment portion is not in contact with the ground. If in such a case, there is a possibility that signals indicating results of detection carried out by those detectors are transmitted together, the reliability regarding the signals transmitted reduces. In contrast, in the foregoing construction, only one detector is embedded within the tread part. Therefore, according to this form, the possibility that a signal transmitted may be a signal that does not accurately reflect the ground contact load of the tire can be excluded if the signal indicating a result of detection carried out by the detector is transmitted only when the detector-embedded portion of the tread part contacts the ground. Hence, the reliability regarding a signal transmitted improves.

In the first aspect, the housing may be a capsule in which the detector and the communication device are enclosed.

In the first aspect, the apparatus may further include a temperature sensor that detects one of a temperature of the detector and a temperature related to the temperature of the detector, wherein a detection value of distortion of the detector is corrected on the basis of the temperature detected by the temperature sensor.

In the first aspect, the housing may be a capsule in which the detector and the temperature sensor are enclosed.

In the first aspect, the tire state quantity detecting apparatus may further include a temperature sensor that detects a temperature of the detector or a temperature associated with the temperature of the detector, and the housing may be a capsule in which the detector and the temperature sensor are enclosed.

In accordance with a second aspect of the invention, a tire state quantity detecting method provided in a tire for detecting a state quantity of the tire includes: outputting a signal from a detector that is embedded in the tire, and that deforms by a force exerted from the tire, the signal corresponding to a quantity of deformation of the detector, wherein a reduction mechanism is disposed between the tire and the detector so as to reduce the quantity of deformation of the detector with respect to a quantity of deformation of the tire, and determining the tire state quantity of the tire based upon the output signal.

BRIEF DESCRIPTION OF THE DRAWINGS

The foregoing and further objects, features and possible advantages of embodiments of the invention will become apparent from the following description of preferred, exemplary embodiments with reference to the accompanying drawings, wherein like numerals are used to represent like elements and wherein:

FIG. 2 is a sectional view illustrating a vehicular tire in which the tire distortion detecting apparatus shown in FIG. 1 is embedded, with the position of embedment being focused on;

DETAILED DESCRIPTION OF PREFERRED EMBODIMENTS

An exemplary embodiment of the invention will be described hereinafter with reference to the accompanying drawings.

Figure 1:
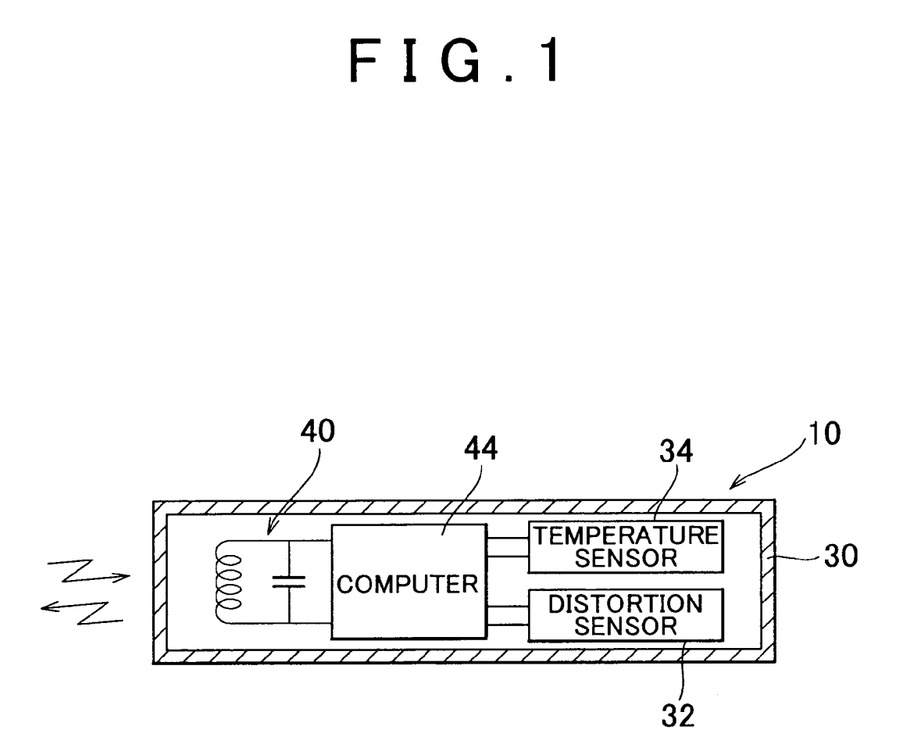
FIG. 1 is a fragmentary sectional view illustrating a tire distortion detecting apparatus in accordance with an embodiment of the invention.
Figure 2:
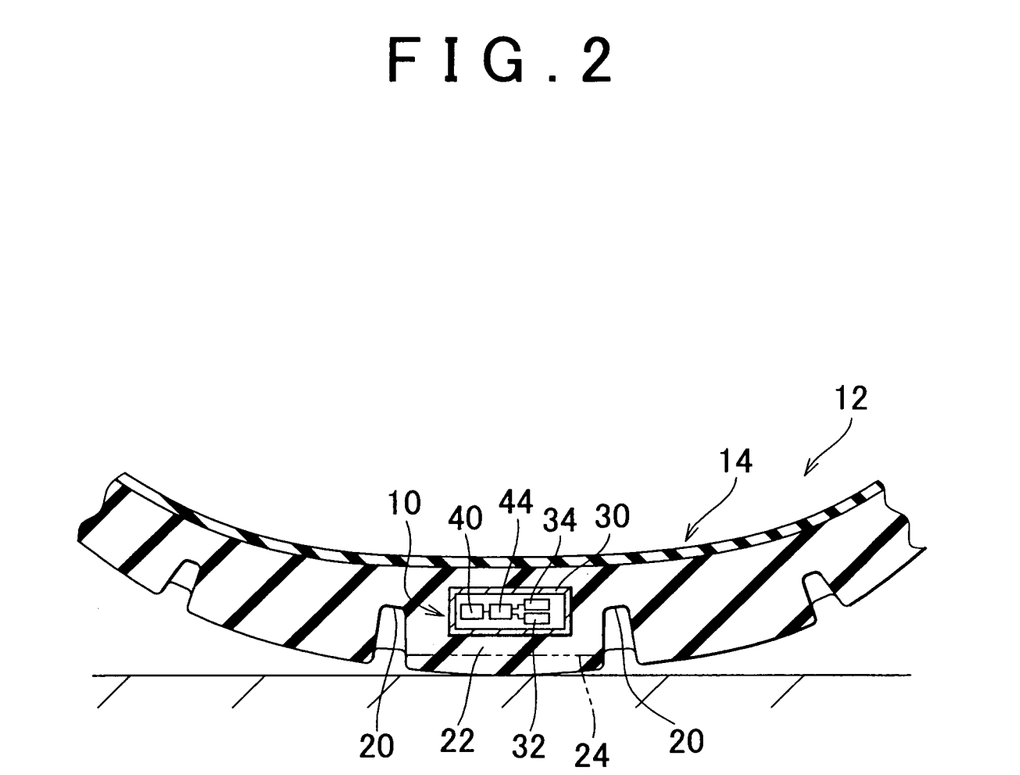

FIG. 1 shows an enlarged fragmentary sectional view of a tire distortion detecting apparatus 10 in accordance with an embodiment of the invention. The tire distortion detecting apparatus 10, as shown in a front sectional view in FIG. 2, is embedded within a tread part 14 of a tire 12. The tire 12 is attached to a wheel (not shown), and contains air. The tire distortion detecting apparatus 10 is used, on the tire 12-side, to detect a distortion of the tire 12 and, on the vehicle body-side, to estimate a ground contact load of the tire 12 on the basis of the detected distortion.

As shown in FIG. 2, a surface of the tread part 14 has a plurality of grooves 20, so that a plurality of rubber-made blocks 22 are arranged in a transverse direction with respect to the tire 12. Each block 22 is adjacent to another block 22 across a groove 20.

In this embodiment, one of the blocks 22 is pre-selected. The tire distortion detecting apparatus 10 is embedded within the pre-selected block 22.

As shown in FIG. 2, the tire distortion detecting apparatus 10 is embedded at such a location in the selected block 22 that the tire distortion detecting apparatus 10 will not be exposed in the surface of the tread part 14 even when the tread part 14 has reached its abrasion (wear) limit. An example of the location of embedment is a location radially inward of a site where a cylindrical surface coaxial with the tire 12 extends through a predetermined location of appearance of a tread wear indicator 24 indicated by a two-dot chain line in FIG. 2.

As shown in FIG. 1, the tire distortion detecting apparatus 10 further includes a capsule 30 that has a substantially totally closed space therein. The capsule 30 is formed of a material having a hardness that is greater than the hardness of a portion of a block among the blocks 22 where the tire distortion detecting apparatus 10 is embedded. Therefore, according to this embodiment, the quantity of expansion and contraction (quantity of deformation) of the distortion gage can be made smaller than the quantity of deformation of the tire 12. Examples of the material of the capsule 30 include glass, hard synthetic resins (e.g., polycarbonate, FRP, PP, PA, etc.). In this embodiment, a non-electrically conductive material has been selected as a material of the capsule 30 because such a material is better for transponder communication described below.

Figure 3:
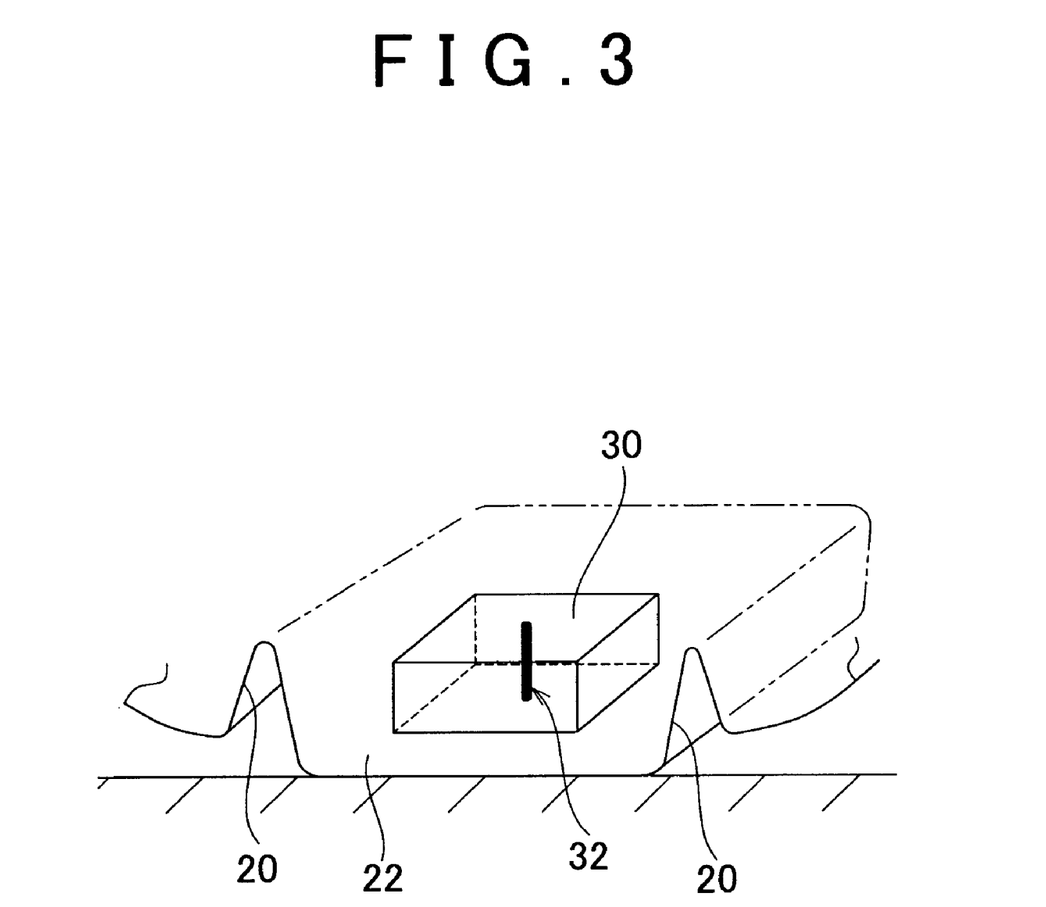
FIG. 3 is an enlarged perspective view of the tire distortion detecting apparatus shown in FIG. 1 which is embedded in the vehicular tire.

As indicated in FIG. 1, a distortion sensor 32 is enclosed in the capsule 30. The distortion sensor 32 is provided as a distortion gage for measuring distortion. As indicated in FIG. 3, the distortion sensor 32 is attached integrally to a member (not shown) that is on an internal surface of the capsule 30 and extends in an up-down direction with respect to the tire 12 with the tire 12 disposed at a predetermined position in a vehicle, in such a posture that the sensor 32 extends parallel to a direction radially outward from the rotation axis of the tire 12.

Therefore, the force exerted from the tire 12 onto the distortion sensor 32 via its capsule 30 consists only of a component that reflects the ground contact load of the tire 12 (i.e., a force that acts in an up-down direction with respect to the tire 12 disposed at a predetermined position in the vehicle), so that the quantity of expansion and contraction of the distortion sensor 32 is dependent on the ground contact load.

As shown in FIG. 1, further enclosed in the capsule 30 of the tire distortion detecting apparatus 10 is a temperature sensor 34 for detecting the temperature of the distortion sensor 32. The distortion sensor 32 expands and contracts depending on not only the ground contact load of the tire 12 but also the temperature of the distortion sensor 32. This is attributed to thermal expansion of the distortion sensor 32. Therefore, in order to make a temperature correction on an output signal of the distortion sensor 32, the temperature sensor 34 is enclosed in the capsule 30 in this embodiment.

As shown in FIG. 1, a transponder 40, which functions as a communication device is also enclosed in the capsule 30 of the tire distortion detecting apparatus 10. The transponder 40 of each tire 12 is driven by electromagnetic energy emitted from a corresponding one of vehicle body-side communication devices 42 (see FIG. 6) that are disposed at specific positions on a vehicle body corresponding to the positions of attachment of the tires 12 to the vehicle body.

Figure 4:
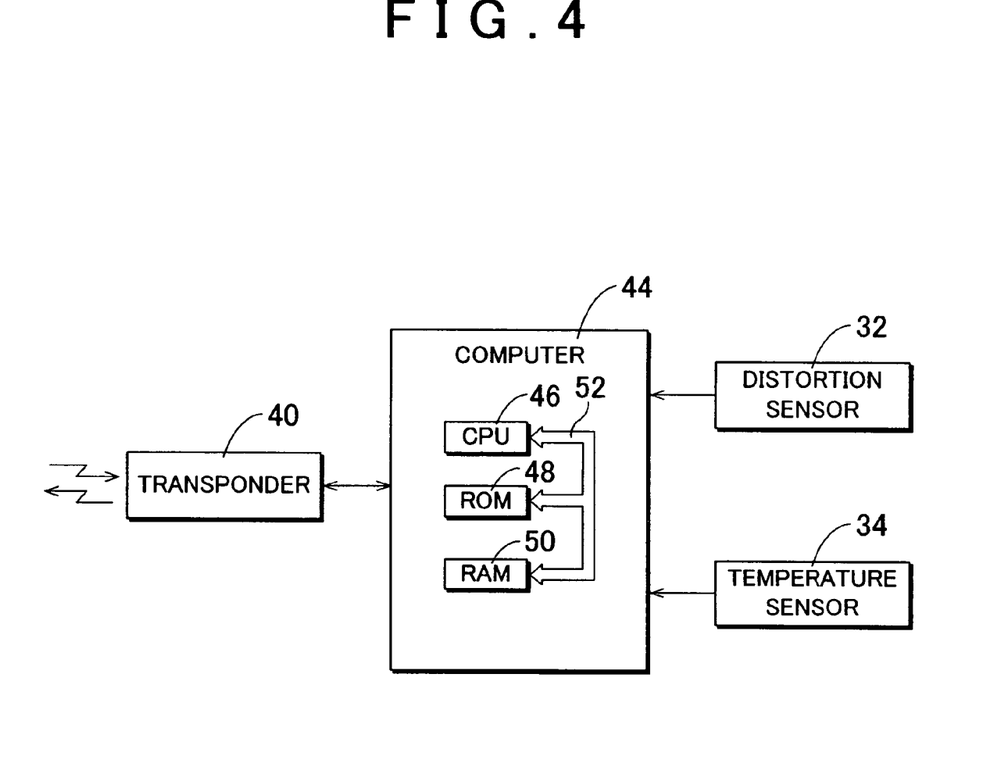
FIG. 4 is a block diagram conceptually illustrating an electrical construction of the tire distortion detecting apparatus shown in FIG. 1.

As shown in FIG. 1, a computer 44 is also enclosed in the capsule 30 of the tire distortion detecting apparatus 10. The computer 44 is provided for processing output signals of the distortion sensor 32 and the temperature sensor 34, and communicating with the vehicle-side device via the transponder 40. As shown in FIG. 4, the computer 44 includes a CPU 46, a ROM 48 and a RAM 50 that are interconnected via a bus 52. The computer 44 is designed to operate on an electric energy converted from electromagnetic energy by the transponder 40 in response to activation of the transponder 40.

Figure 5:
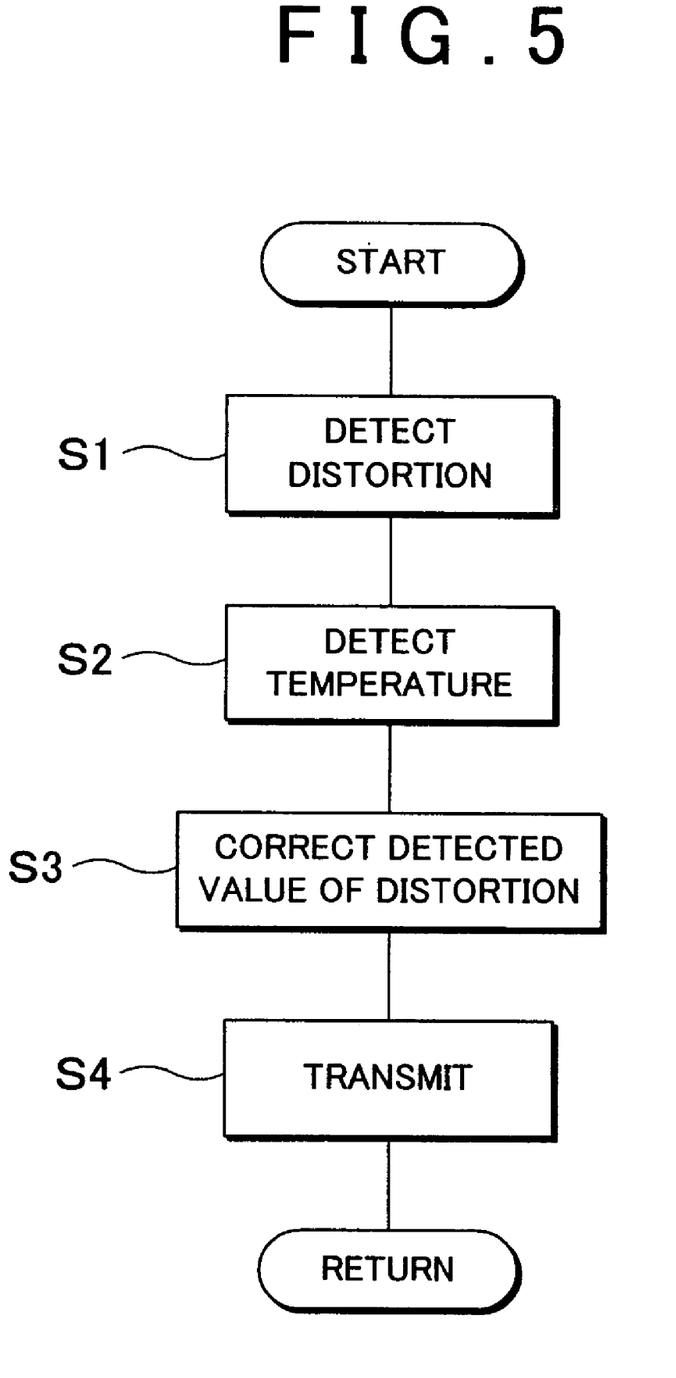
FIG. 5 is a flowchart conceptually illustrating a content of a distortion detecting program stored in a ROM shown in FIG. 4.

A distortion detection program illustrated conceptually by a flowchart in FIG. 5 is stored in the ROM 48 of the computer 44. The distortion detection program is executed by the CPU 46 of the computer 44.

First, in step S1 (hereinafter, simply referred to as "S1"; other steps will be similarly referred to) in the distortion detection program, the distortion of the distortion gage is detected on the basis of the output signal of the distortion sensor 32. Subsequently in S2, the temperature of the distortion gage is detected on the basis of the output signal of the temperature sensor 34.

Subsequently in S3, the detection value of distortion is corrected on the basis of the detected temperature. (That is, a temperature correction is made on the detection value of distortion.) The correction of the detection value of distortion is performed in accordance with a predetermined relationship between the temperature (quantity of change from a reference temperature) and the value obtained by correcting the detection value of distortion (or quantity of correction of the detection value of distortion). The relationship is stored in the ROM 48 in the form of a function expression (i.e., an equation), a table, a map, etc.

Subsequently in S4, a signal indicating the value obtained by correction of the detection value of distortion is transmitted to the vehicle body side via the transponder 40. As a result, on the vehicle body side, a distortion detection signal indicating the tire distortion is received with respect to each tire 12.

In this fashion, a cycle of execution of the tire distortion detecting apparatus 10 is completed.

Figure 6:
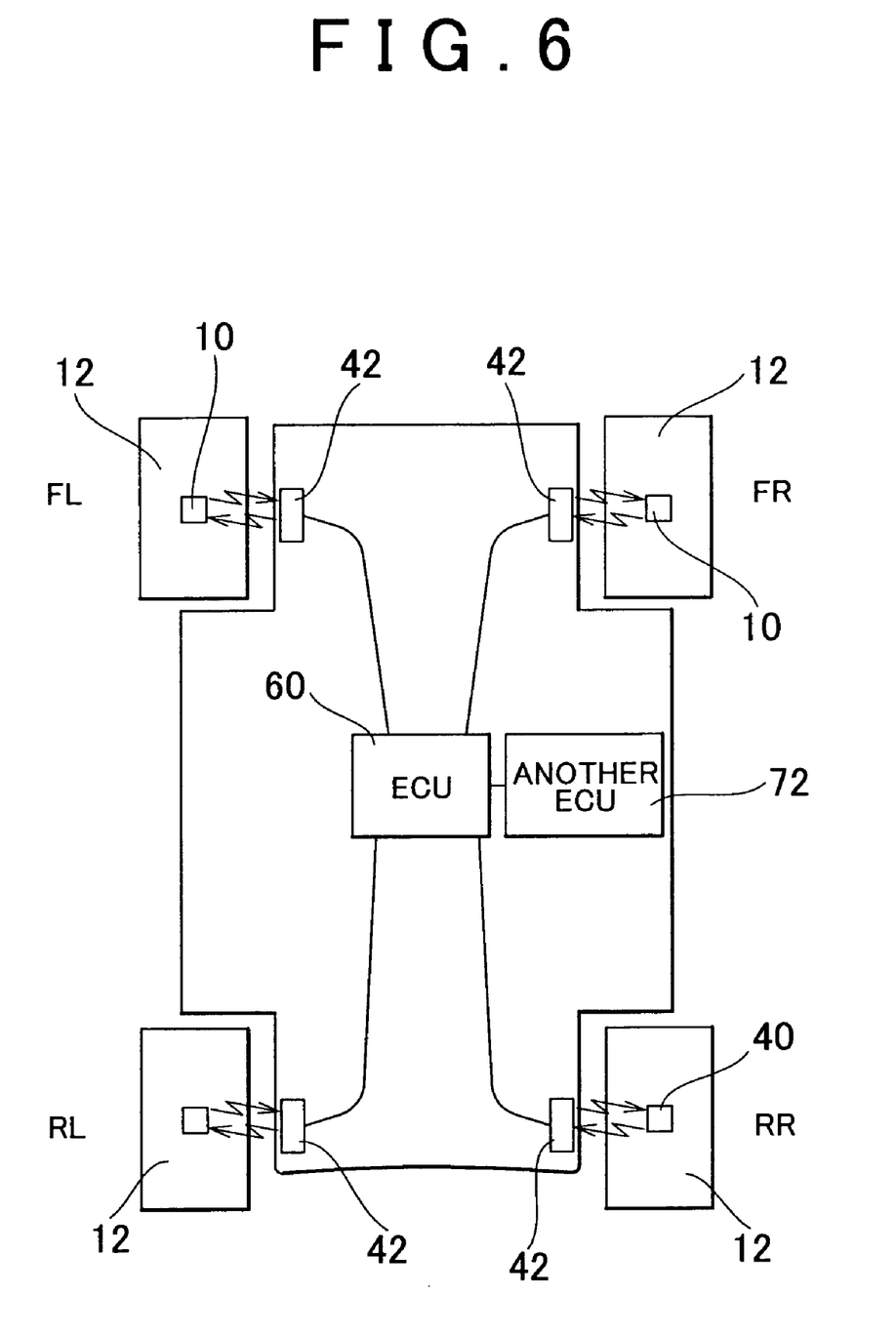
FIG. 6 is a plan view of a vehicle equipped with the tire distortion detecting apparatus shown in FIG. 1, illustrating an electrical construction adopted on the vehicle body side.

FIG. 6 conceptually illustrates in a plan view a hardware construction provided on the vehicle body side for processing signals from each tire distortion detecting apparatus 10. As indicated in FIG. 6, an electronic control unit (hereinafter, referred to as "ECU") 60 is provided on the vehicle body as a common unit for the plural tires 12 in this embodiment, so as to estimate the ground contact load of each tire 12 on the basis of a signal from a corresponding one of the tire state quantity detecting apparatus 10. In the figures, the vehicle tires are referred to as FL (front left), FR (front right), RL (rear left) and RR (rear right).

Figure 7:
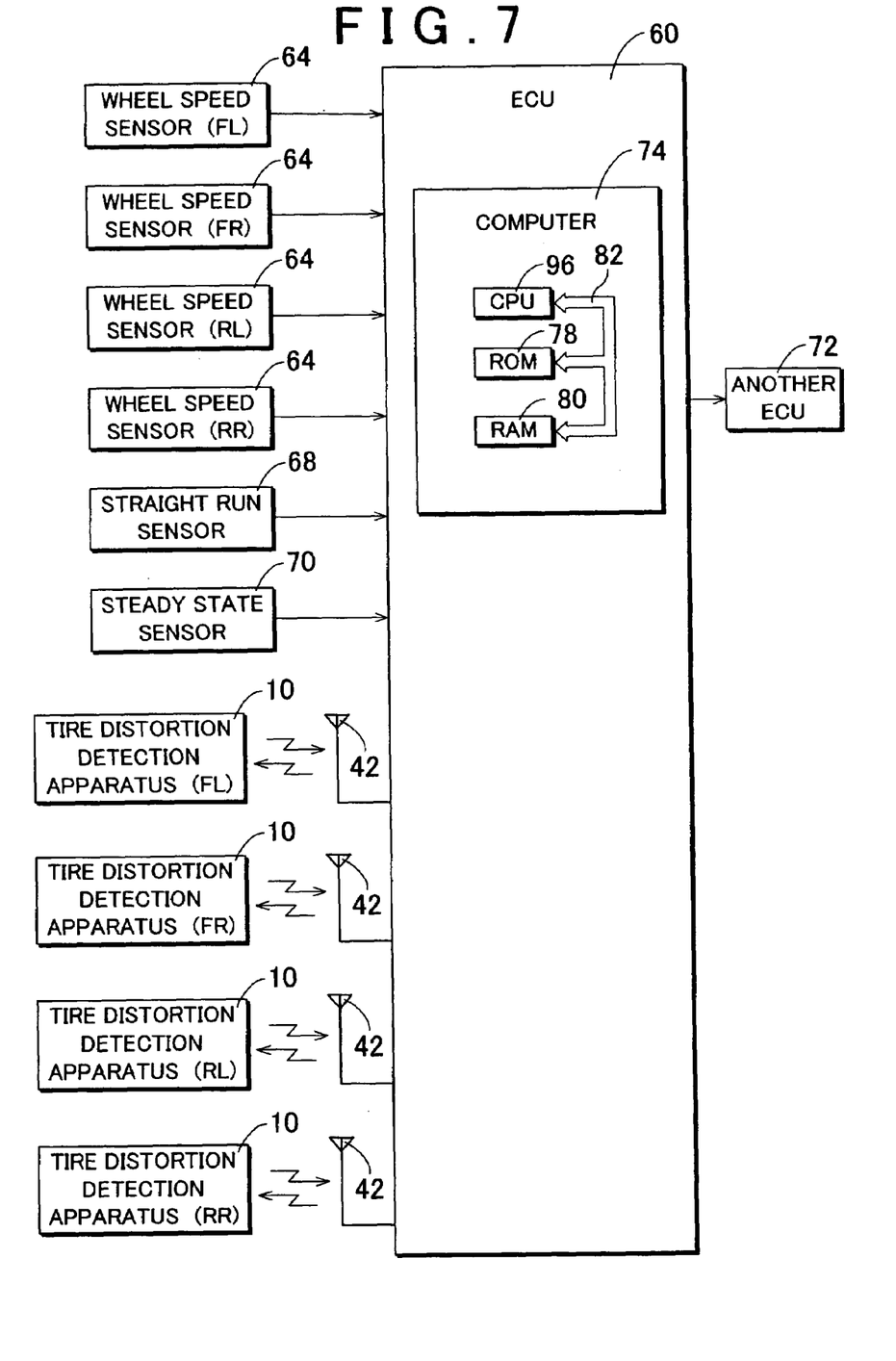
FIG. 7 is a block diagram illustrating a construction of an ECU shown in FIG. 6, and components connected to the ECU.

As indicated in FIG. 7, four wheel speed sensors 64 provided for the individual tires 12 are connected to the ECU 60. Each wheel speed sensor 64 is attached to a fixed position on the vehicle body which is adjacent to a rotor (not shown) that rotates together with the corresponding tire 12, as is well known. The rotor has a plurality of teeth (e.g., 48 teeth) that are aligned on an outer peripheral surface of the rotor, along a circumference that is coaxial with the tire 12. Each wheel speed sensor 64 is an electromagnetic pickup that electromagnetically detects the passage of each tooth of the rotor. Each wheel speed sensor 64 generates a voltage signal in the form of pulses rising in response to every tooth of the rotor passing by.

Each wheel speed sensor 64 is used for two purposes, that is, for detecting the angular speed of a corresponding tire 12 as a wheel speed by cooperating with the corresponding rotor, and for receiving a distortion detection signal from the tire distortion detecting apparatus 10 embedded in the corresponding tire 12 by activating the transponder 40 at the timing at which a portion of the tire 12 where the tire distortion detecting apparatus 10 is embedded contacts the road surface.

As indicated in FIG. 7, a straight run sensor 68 is also connected to the ECU 60. The straight run sensor 68 is provided for detecting that the vehicle is in a straight running state, that is, the vehicle is not in a cornering state (steered state). The straight run sensor 68 may be designed in various fashions, for example, a fashion in which a sensor for detecting the operation angle of a steering wheel that is operated by a driver is used as a main component, a fashion in which a sensor for detecting the yaw rate or the lateral acceleration of the vehicle is used as a main component, or a fashion in which a sensor for detecting a physical quantity related to the aforementioned physical quantities is used as a main component.

As indicated in FIG. 7, a steady state sensor 70 is also connected to the ECU 60. The steady state sensor 70 is provided for detecting that the vehicle is in a steady state, that is, the vehicle is not in a transitional state (accelerating state, decelerating state, braking state, etc.). The steady state sensor 70 may be designed in various fashions, for example, a fashion in which a sensor for detecting the quantity of operation accomplished by a driver for accelerating, decelerating or braking the vehicle is used as a main component, a fashion in which a sensor for detecting the acceleration or deceleration of the vehicle is used as a main component, or a fashion in which a sensor for detecting a physical quantity related to the aforementioned physical quantities is used as a main component.

Furthermore, four vehicle body-side communication devices 42 disposed on the vehicle body in association with the tires 12 are connected to the ECU 60 as indicated in FIG. 7. Each vehicle body-side communication device 42 has the function of supplying the transponder 40 of the tire distortion detecting apparatus 10 embedded in a corresponding tire 12 with electromagnetic energy for driving the transponder 40, at a timing at which a portion where the tire distortion detecting apparatus 10 is embedded contacts the road surface, and the function of receiving the detection signal output by the transponder 40.

As indicated in FIG. 7, another ECU 72 is connected to the ECU 60. An example of the ECU 72 is an ECU that is provided for controlling the motion of the vehicle on the basis of the tire ground contact load.

The ECU 60 is formed mainly of a computer 74. The computer 74 includes a CPU 96, a ROM 78 and a RAM 80 that are interconnected by a bus 82 (as is well known). The ECU 60 is designed so as to estimate the ground contact load of each tire 12 on the basis of the detection signals received from the tire distortion detecting apparatus 10, and transmit signals indicating results of the estimation to the ECU 72. To that end, a ground contact load estimating program executed by the CPU 96 for estimating the ground contact load of each tire 12 is stored in the ROM 78.

Figure 8:
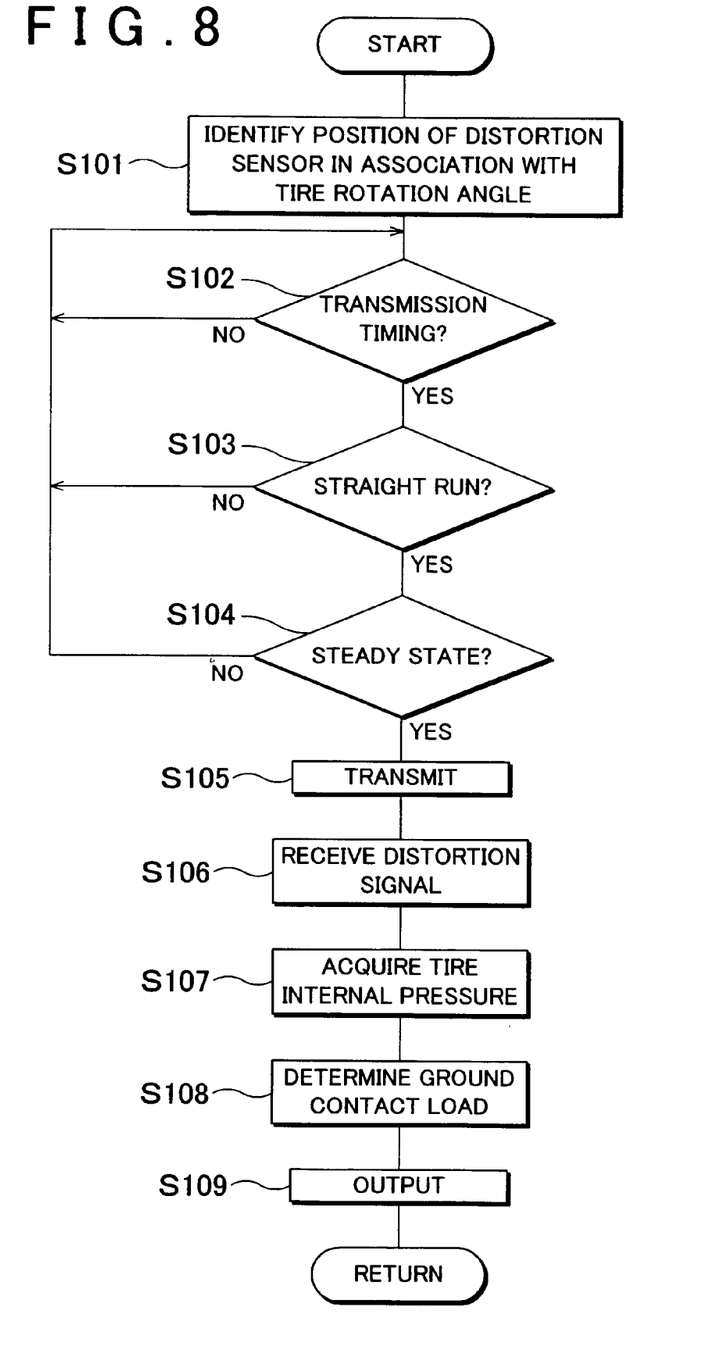
FIG. 8 is a flowchart conceptually illustrating a content of a ground contact load estimating program stored in a ROM shown in FIG. 7.

FIG. 8 is a flowchart conceptually illustrating a content of the ground contact load estimating program. The ground contact load estimating program is repeatedly executed separately for each tire 12 while the electric power supply to the computer 74 is on.

During the present execution of the ground contact load estimating program of a tire 12, in S101, the position of embedment of the distortion sensor 32 in the tire 12 (i.e., the position of embedment of the tire distortion detecting apparatus 10) is identified in association with the rotation angle of the tire 12 (e.g., the number assigned to each tooth of the rotor).

In the identifying process, for example, the corresponding vehicle body-side communication device 42 transmits a plurality of signals to the tire 12 at relative short intervals. In response to each one of the signals, the tire distortion detecting apparatus 10 transmits a distortion detection signal, and the distortion detection signal is received by the vehicle body-side communication device 42. In the ECU 60, the level of each distortion detection signal received is stored in association with the tire rotation angle at the timing of signal reception. During at least one rotation of the tire 12, such signal exchange is performed, and the ECU 60 receives a plurality of distortion detection signals. Then, the tire rotation angle corresponding to the timing of reception of the highest-level signal among the distortion detection signals received is stored in the ECU 60 as a tire rotation angle at the time of ground contact at which a portion of the tread part 14 where the distortion sensor 32 is embedded contacts the ground.

After the identification process, arrival of a transmission timing at which a signal is to be transmitted to each tire distortion detecting apparatus 10 is awaited in S102 by waiting for the actual value of the tire rotation angle to become equal to the ground contact-time tire rotation angle on the basis of the output signal of the wheel speed sensor 64. When the transmission timing arrives, the answer to the determination in S102 becomes "YES", and the process proceeds to S103.

In S103, it is determined whether the vehicle is in a straight running state on the basis of the output signal of the straight run sensor 68. If the vehicle is running straight, the answer to the determination becomes "YES", and the process proceeds to S104. Conversely, if the vehicle is not in the straight running state, the answer to the determination becomes "NO", and the process returns to S102.

When the answer to the determination at S103 is "YES" as the vehicle is in the straight running state, it is determined in S104 whether the vehicle is in a steady state on the basis of the output signal of the steady state sensor 70. If the vehicle is in a steady state, the answer to the determination becomes "YES", and the process proceeds to S105. Conversely, if the vehicle is not in the steady state, the answer to the determination becomes "NO", and the process returns to S102.

Figure 9A:
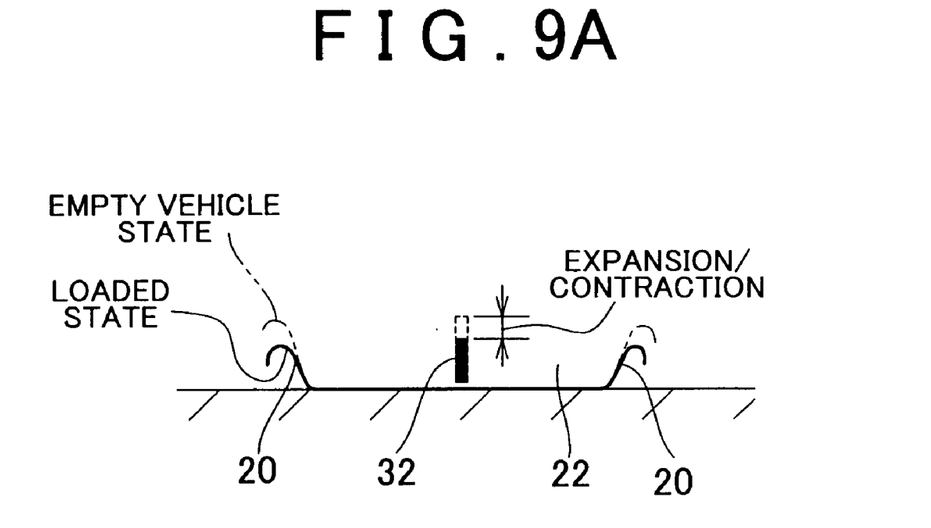
FIGS. 9A and 9B are perspective views for illustrating functions performed in steps S103 and S104 in FIG. 8.

If the vehicle is in the straight running state and in the steady state, the deformation that occurs in the block 22 in which the distortion gage is embedded is based only on the ground contact load as indicated in FIG. 9A, so that the quantity of expansion/contraction of the distortion gage from the natural length thereof is dependent only on the ground contact load. Therefore, in this case, the ground contact load can be accurately estimated with reference to the distortion of the distortion gage.

Figure 9B:
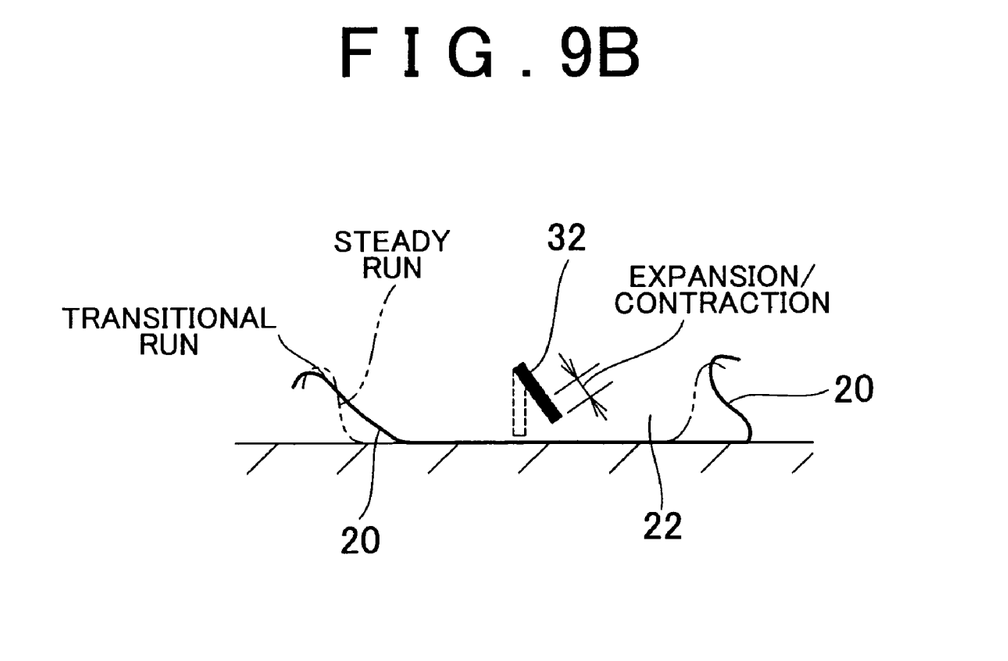

In contrast, if the vehicle is in a cornering state or an accelerating, decelerating or braking state, the block 22 containing the distortion gage is twisted as conceptually illustrated in FIG. 9B. Therefore, deformation independent of the ground contact load occurs as well as deformation based on the ground contact load. Therefore, the quantity of expansion/contraction of the distortion gage from the natural length thereof is dependent not only the ground contact load. Therefore, in this case, it is difficult to accurately estimate the ground contact load with reference to the distortion of the distortion gage, and it is necessary to perform, for example, a special signal process of extracting, from a composite signal of the distortion sensor 32, the component that is based only on the ground contact load.

Therefore, in this embodiment, the tire distortion detecting apparatus 10 is caused to detect distortion, and the ECU 60 receives the signal indicating the distortion, only in the case where the vehicle is in the straight running state and the steady state.

In addition, tire-acting force, including lateral force acting on a tire 12, and the like, can be estimated on the basis of the output signal of the distortion sensor 32 generated during the acceleration/deceleration or cornering of the vehicle, and the output signal of the distortion sensor 32 generated during the straight running state and the steady running state.

In S105 in FIG. 8, signals are transmitted from the vehicle body-side communication device 42 to the tire distortion detecting apparatus 10. Subsequently in S106, a distortion detection signal indicating the distortion of the present object tire 12 is received from the tire distortion detecting apparatus 10. After that, in S107, the tire internal pressure, that is, the air pressure of the present object tire 12, is acquired. The tire internal pressure can be acquired by, for example, receiving a signal from a sensor provided in the tire 12 or its wheel for directly detecting the air pressure of the tire 12, or estimating the tire internal pressure on the vehicle body side on the basis of the output signal of the wheel speed sensor 64, etc.

Figure 10:
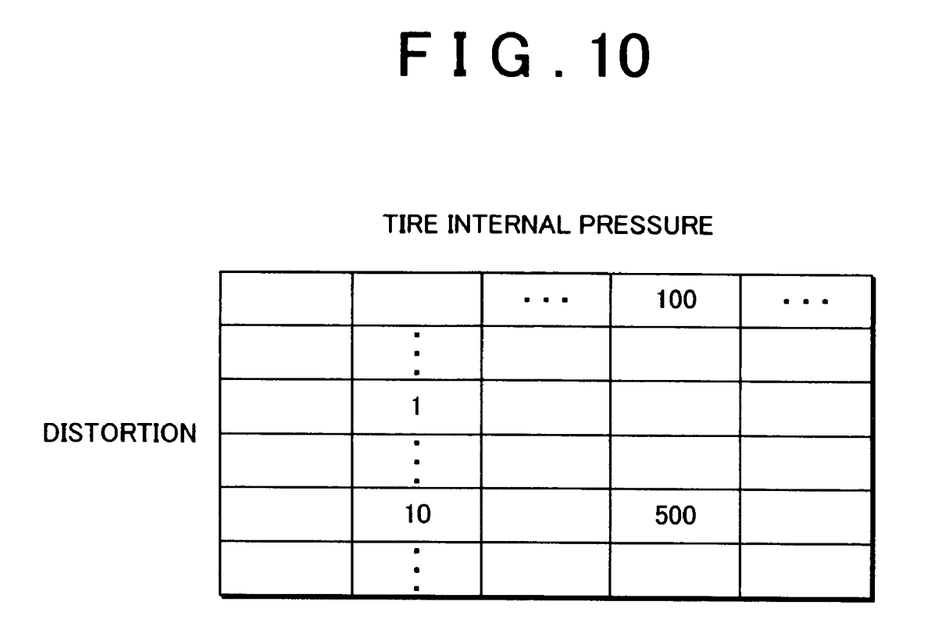
FIG. 10 is a diagram for illustrating a content carried out in step S108 in FIG. 8.

Subsequently in S108, the ground contact load of the tire 12 is determined on the basis of the distortion (distortion obtained through temperature correction) indicated by the distortion detection signal received as described above, and the tire internal pressure acquired as described above. In the embodiment, the relationship between the distortion and the tire internal pressure is stored in the ROM 78 in the form of a function expression (equation), a table, a map, etc. as indicated in the form of a table in FIG. 10, and the ground contact load corresponding to the present distortion and the present tire internal pressure in accordance with this relationship is determined as a present ground contact load.

Subsequently in S109, the present ground contact load determined as described above is associated with the position of attachment of the present object tire 12, and is output to the other ECU 72.

In this manner, one cycle of execution of the ground contact load estimating program is completed.

As is apparent from the foregoing description, the tire distortion detecting apparatus 10 in this embodiment may be regarded as a tire state quantity detecting apparatus in accordance with one embodiment of the invention. Furthermore, the distortion of a tire 12 (the distortion thereof in an up-down direction with respect to the tire 12 being disposed at a predetermined position in the vehicle) may be regarded as a tire state quantity in accordance with one embodiment of the invention. Still further, the distortion sensor 32 may be regarded as a detector in accordance with one embodiment of the invention. The capsule 30 may be regarded as a reduction mechanism in accordance with one embodiment of the invention.

The controller (e.g., the computer 44 and/or the ECU 60) of the illustrated exemplary embodiments is implemented as a programmed general purpose computer. It will be appreciated by those skilled in the art that the controller can be implemented using one or more special purpose integrated circuits (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using one or more suitably programmed general purpose computers, e.g., microprocessor, microcontroller or other processor devices (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to an exemplary embodiment thereof, it is to be understood that the invention is not limited to the exemplary embodiment and construction. To the contrary, the invention is intended to cover various modifications and equivalent arrangements. In addition, while the various elements of the exemplary embodiment are shown in various combinations and configurations, which are exemplary, other combinations and configuration, including more, less or only a single element, are also within the spirit and scope of the invention.

What is claimed is:

1. A tire state quantity detecting apparatus provided in a tire for detecting a tire state quantity of the tire, comprising:

a detector that is embedded in the tire, and that deforms by a force exerted from the tire, and that outputs a signal corresponding to a quantity of deformation of the detector; and a reduction mechanism that is disposed between the tire and the detector, and that dynamically reduces the quantity of deformation of the detector with respect to a quantity of deformation of the tire, wherein the tire state quantity is detected based on the output signal of the detector.

2. The tire state quantity detecting apparatus according to claim 1, wherein the reduction mechanism includes a housing that accommodates the detector in the tire, and that has a hardness that is greater than a hardness of an embedment portion of the tire in which the detector is embedded.

3. The tire state quantity detecting apparatus according to claim 2, further comprising a communication device that wirelessly transmits a signal indicating a result of detection carried out by the detector, wherein the housing is a capsule in which the detector and the communication device are enclosed.

4. The tire state quantity detecting apparatus according to claim 2, further comprising a temperature sensor that detects one of a temperature of the detector and a temperature related to the temperature of the detector, wherein a detection value of distortion of the detector is corrected on the basis of the temperature detected by the temperature sensor.

5. The tire state quantity detecting apparatus according to claim 4, wherein the housing is a capsule in which the detector and the temperature sensor are enclosed.

6. The tire state quantity detecting apparatus according to claim 1, wherein the quantity of deformation of the detector includes a quantity of deformation that occurs in an up-down direction with respect to the tire disposed at a predetermined position with respect to a vehicle, and that is based on a ground contact load of the tire, and the detector is embedded in a tread part of the tire.

7. The tire state quantity detecting apparatus according to claim 6, wherein the tire state quantity detecting apparatus is used together with a signal processor that processes an output signal of the detector occurring when an embedment portion of the tread part in which the detector is embedded contacts a ground, as a signal that indicates the quantity of deformation of the detector, based on a rotation angle of the tire.

8. The tire state quantity detecting apparatus according to claim 1, further comprising a communication device that wirelessly transmits a signal indicating a result of detection carried out by the detector.

9. The tire state quantity detecting apparatus according to claim 8, wherein the quantity of deformation of the detector includes a quantity of deformation that occurs in an up-down direction with respect to the tire disposed at a predetermined position with respect to a vehicle, and that is based on a ground contact load of the tire, and wherein the detector is embedded in a tread part of the tire, and wherein the communication device transmits a signal indicating a result of detection carried out by the detector when an embedment portion of the tread part in which the detector is embedded contacts the ground.

10. The tire state quantity detecting apparatus according to claim 9, wherein the number of detectors embedded in the tread part is one.

11. The tire state quantity detecting apparatus according to claim 1, wherein the detector includes at least one of an electrical capacitance type displacement sensor, a piezoelectric element and a distortion gage, each adapted to measure a parameter that reflects a ground contact load of the tire.

12. A method of detecting a tire state quantity of a tire, comprising the steps of:

outputting a signal from a detector that is embedded in the tire, and that deforms by a force exerted from the tire, the signal corresponding to a quantity of deformation of the detector, wherein a reduction mechanism is disposed between the tire and the detector so as to reduce the quantity of deformation of the detector with respect to a quantity of deformation of the tire;

determining the tire state quantity of the tire based upon the output signal; and outputting the result of the tire state quantity determining step.

13. The method according to claim 12, wherein the reduction mechanism includes a housing in which the detector is disposed and which is embedded in the tire, and the housing has a hardness that is greater than a hardness of an embedment portion of the tire in which the housing is embedded.

14. The method according to claim 13, further comprising the steps of:

wirelessly transmitting a signal indicating a result of detection carried out by the detector, and wherein the housing is a capsule in which the detector and a communication device that wirelessly transmits are enclosed.

15. The method according to claim 13, further comprising the steps of:

detecting one of a temperature of the detector and a temperature related to the temperature of the detector using a temperature sensor; and correcting a detection value of distortion of the detector on the basis of the temperature detected by the temperature sensor.

16. The method according to claim 12, wherein the quantity of deformation of the detector includes a quantity of deformation that occurs in an up-down direction with respect to the tire disposed at a predetermined position with respect to a vehicle, and that is based on a ground contact load of the tire, and the detector is embedded in a tread part of the tire.

17. The method according to claim 16, wherein a signal processor processes the output signal of the detector occurring when an embedment portion of the tread part in which the detector is embedded contacts a ground, as a signal that indicates the quantity of deformation of the detector, based on a rotation angle of the tire.

18. The method according to claim 12, further comprising the step of wirelessly transmitting a signal indicating a result of detection carried out by the detector.

19. The method according to claim 18, wherein the quantity of deformation of the detector includes a quantity of deformation that occurs in an up-down direction with respect to the tire disposed at a predetermined position with respect to a vehicle, and that is based on a ground contact load of the tire, and wherein the detector is embedded in a tread part of the tire, and wherein a communication device transmits the signal indicating a result of detection carried out by the detector when an embedment portion of the tread part in which the detector is embedded contacts the ground.

20. The method according to claim 19, wherein the number of detectors embedded in the tread part is one.

21. The method according to claim 12, wherein the detector includes at least one of an electrical capacitance type displacement sensor, a piezoelectric element and a distortion gage, each adapted to measure a parameter that reflects a ground contact load of the tire.

* * * * *